United States Patent Office 2,728,791
Patented Dec. 27, 1955

2,728,791

TRI(3-METHYL-1-BUTYN-3YL) PHOSPHITE AND METHOD FOR PREPARING SAME

Daniel C. Rowlands, Worthington, Ohio, assignor, by mesne assignments, to Air Reduction Company, Incorporated, New York, N. Y., a corporation of New York No Drawing. Application April 21, 1954, Serial No. 424,749

2 Claims. (Cl. 260—461)

This invention relates to a novel chemical compound and to a process for preparing said compound.

More particularly, the invention is concerned with the new substance tri(3-methyl-1-butyn-3-yl)phosphite which can be represented by the formula

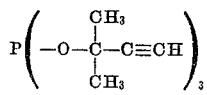

This new compound can be used as an insecticide and as a heat stabilizer for vinyl chloride resins; and may be useful as a gasoline or lubricating oil additive to retard carbon deposits in engines.

Tri(3-methyl-1-butyn-3-yl)phosphite can be obtained by reacting 3-methyl-1-butyn-3-ol with phosphorus trichloride. In carrying out the reaction, it is preferable that anhydrous conditions be maintained during the reaction. Inert solvent media such as petroleum ether may be employed. The reaction is advantageously carried out in the presence of a material capable of accepting the hydrogen chloride released by the ester formation. Such materials are usually basic amines which form hydrogen chloride salts; pyridine is representative of such amines.

The invention is further disclosed in the following example, which is illustrative, but not limitative thereof.

*Example*

Low-boiling petroleum ether (300 to 400 ml.) was placed in a one-liter flask together with pyridine (79.1 g., 1.0 mole) and methyl butynol (84.1 g., 1.0 mole). Phosphorus trichloride (45.8 g., 0.33 mole) was added dropwise over a period of 3.5 hours while the temperature was maintained between —2° and +3° C. When the phosphorus trichloride had all been added, the mixture was stirred below 5° C. for 1 hour and allowed to warm to room temperature overnight. Pyridine hydrochloride was removed by filtration. Solvent was removed from the filtrate and the residue was heated to 90° C. at 9 mm. The residue was taken up in ether, washed with dilute hydrochloric acid and water and dried over potassium carbonate to obtain, after removal of ether, 49.0 g. of a heavy light-yellow oil (52% yield): calculated for P in $C_{15}H_{21}O_3P$, 11.05%; found 10.8%.

What is claimed is:
1. The compound tri(3-methyl-1-butyn-3-yl)phosphite.
2. A process for preparing tri(3-methyl-1-butyn-3-yl)-phosphite which comprises reacting 3-methyl-1-butyn-3-ol with phosphorus trichloride in the presence of a hydrogen chloride acceptor.

References Cited in the file of this patent
UNITED STATES PATENTS 2,318,959    Muskat et al.    May 11, 1943
2,589,326    Obberight    Mar. 18, 1952

OTHER REFERENCES

Kosolapoff: Organo-Phosphorus Compounds, page 184 (1950), John Wiley, N. Y.